US012681762B2

(12) United States Patent
Sharma et al.

(10) Patent No.: US 12,681,762 B2
(45) Date of Patent: Jul. 14, 2026

(54) AFFINITY DATA SYSTEM FOR DATA MANAGEMENT

(71) Applicant: International Business Machines Corporation, Armonk, NY (US)

(72) Inventors: Mayank Sharma, Bengaluru (IN); Aditi Bhattacharya, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/160,339

(22) Filed: Jan. 27, 2023

(65) Prior Publication Data

US 2024/0256342 A1     Aug. 1, 2024

(51) Int. Cl.
| | |
|---|---|
| *G06F 9/50* | (2006.01) |
| *G06F 9/48* | (2006.01) |
| *H04L 45/12* | (2022.01) |
| *H04L 45/122* | (2022.01) |

(52) U.S. Cl.
CPC .............. *G06F 9/5027* (2013.01); *G06F 9/48* (2013.01); *G06F 9/4806* (2013.01); *G06F 9/4843* (2013.01); *G06F 9/4881* (2013.01); *G06F 9/50* (2013.01); *H04L 45/12* (2013.01); *H04L 45/122* (2013.01); *H04L 45/123* (2013.01)

(58) Field of Classification Search
CPC ........ G06F 9/48; G06F 9/4806; G06F 9/4843; G06F 9/4881; G06F 9/50; G06F 9/5027; H04L 45/12; H04L 45/122; H04L 45/123
See application file for complete search history.

(56) References Cited

U.S. PATENT DOCUMENTS

| | | | |
|---|---|---|---|
| 10,819,757 B2 | 10/2020 | Lawson et al. | |
| 11,916,674 B2 * | 2/2024 | Bajaj | H04L 43/0882 |
| 2002/0143953 A1 * | 10/2002 | Aiken, Jr. | H04L 67/14 |
| | | | 709/227 |
| 2015/0186180 A1 | 7/2015 | Schroth et al. | |
| 2015/0326457 A1 * | 11/2015 | Wu | H04L 43/0811 |
| | | | 370/252 |
| 2017/0052855 A1 | 2/2017 | Somogyi et al. | |
| 2017/0153910 A1 | 6/2017 | Shen et al. | |
| 2020/0004582 A1 * | 1/2020 | Fornash | G06F 9/4856 |
| 2020/0019631 A1 | 1/2020 | Fan et al. | |
| 2020/0351900 A1 * | 11/2020 | Zhang | H04W 4/029 |
| 2022/0200894 A1 * | 6/2022 | Carnes, III | H04L 45/22 |
| 2022/0231949 A1 * | 7/2022 | Ramaswamy | H04L 47/125 |
| 2022/0239595 A1 * | 7/2022 | Siemens | H04L 47/12 |
| 2023/0363057 A1 * | 11/2023 | Ji | H04W 88/04 |

OTHER PUBLICATIONS

Davies et al., "Detecting Inter-Transaction Affinities", An IP.com Prior Art Database Technical Disclosure, IPCOM000112706D, Mar. 27, 2005, 5 pages.

* cited by examiner

*Primary Examiner* — Charles M Swift

(74) *Attorney, Agent, or Firm* — Yee & Associates, P.C.

(57) ABSTRACT

A computer implemented method determines resource affinity for an application is provided. A number of processor units determine connections in affinity data for the workloads for an application. The number of processor units assign weights to the connections based on a number of hops for the connections. The weights indicate the affinity to components related to the set of workloads.

20 Claims, 10 Drawing Sheets

COMPUTING ENVIRONMENT
100

AFFINITY DATA SYSTEM FOR DATA MANAGEMENT

BACKGROUND

The disclosure relates generally to an improved computer system and more specifically to a computer implemented method, apparatus, system, and computer program product for determining resource affinity for an application.

Data processing environments can have numerous data sets with different structures and locations. For example, with a banking system, the system can use a number of different types of technologies that interact with entities such as other banks, a central bank, a regulatory agencies, customers, and other entities. With these different entities, processes for handling data for transactions can occur at different times with different frequencies. For example, some data processing can occur nightly, while others run on weekends or at month-ends. Yet other data processing can occur on specific dates of year end. All of this data processing can result in different and unique data sets. These data sets can be located centrally or in remote locations.

SUMMARY

According to one illustrative embodiment, a computer implemented method for determining resource affinity for an application is provided. A number of processor units determine connections in affinity data for the workloads for an application. The number of processor units assign weights to the connections based on a number of hops for the connections. According to other illustrative embodiments, a computer system and a computer program product for determining resource affinity are provided. The weights indicate the affinity to components related to the set of workloads.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
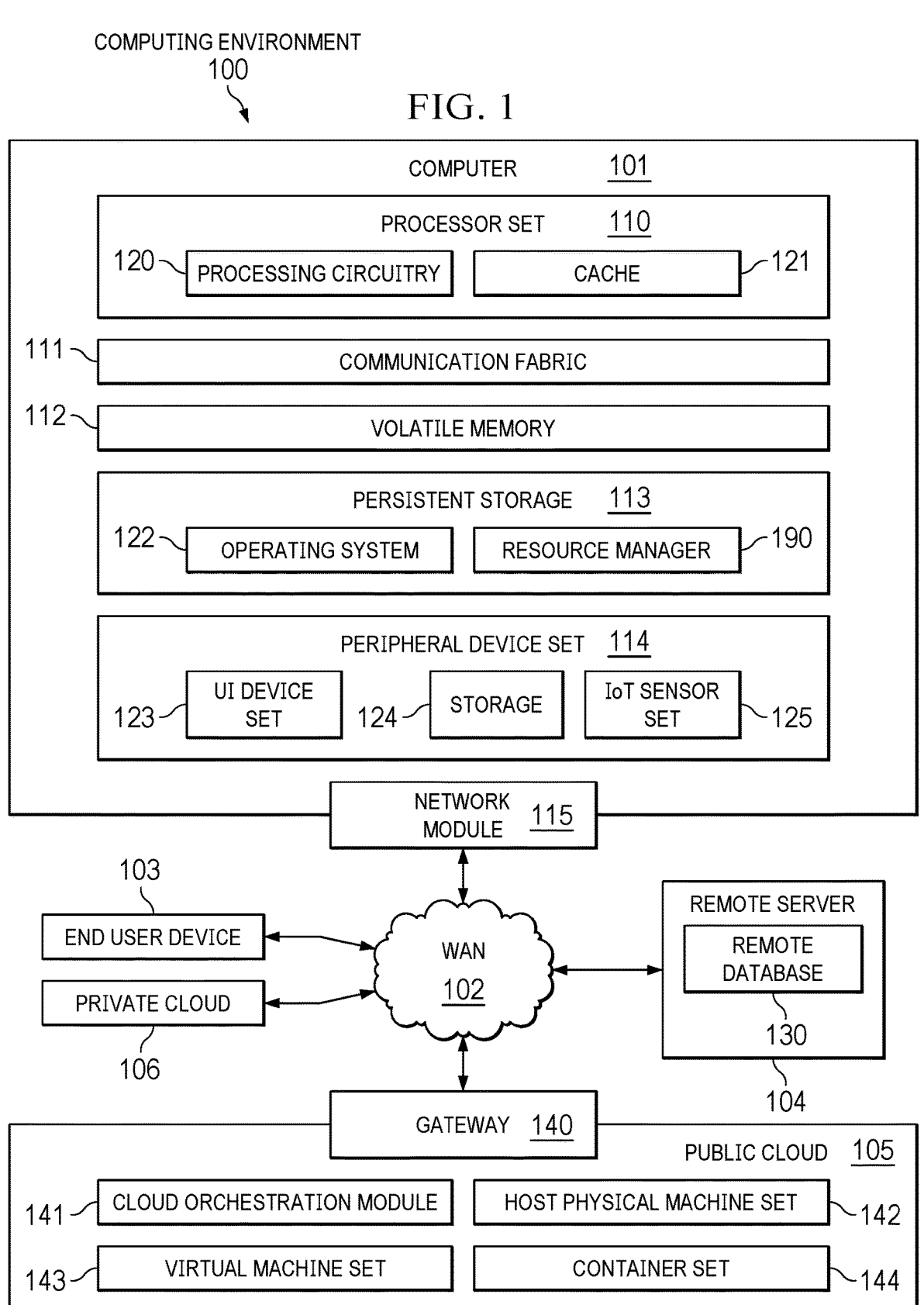
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as resource manager 190. In addition to resource manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and resource manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in resource manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in resource manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, determining the relationship between data in different datasets can be more difficult than desired with data processing environments having numerous unique different datasets that can be in various locations, and having various processes operating on these different datasets at different times.

The illustrative embodiments recognize that determining the relationship between the data can be determined through collecting information about outgoing communications, incoming communications, and communications within mainframe computer, a server computer, network, or other platform.

Figure 2:
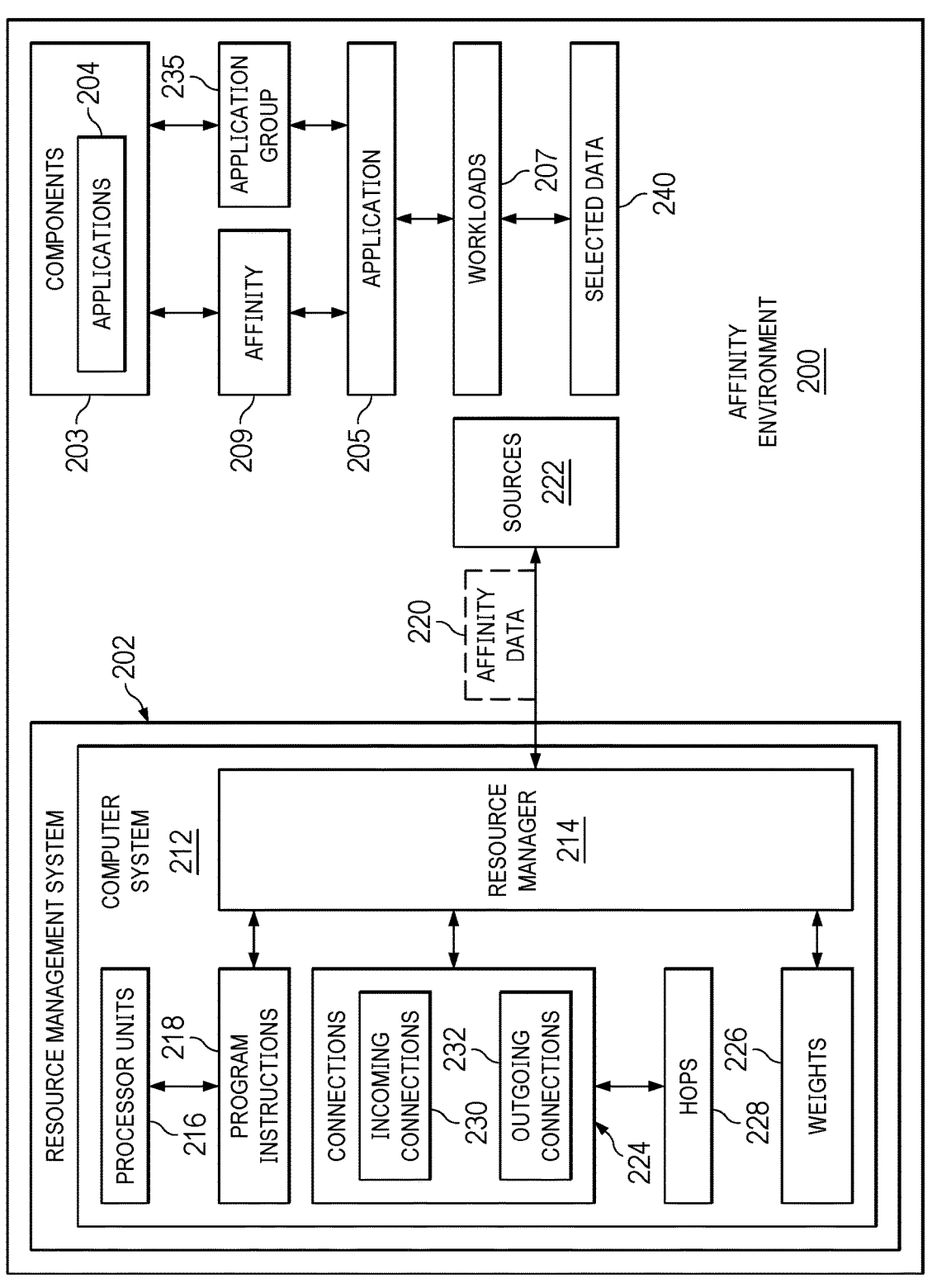
FIG. 2 is a block diagram of an affinity environment in accordance with an illustrative embodiment.

With reference now to FIG. 2, a block diagram of an affinity environment is depicted in accordance with an illustrative embodiment. As depicted in this example, affinity environment 200 includes components that can be implemented in hardware such as the hardware shown in computing environment 100 in FIG. 1.

In this illustrative example, resource management system 202 can manage components 203 in affinity environment 200. For example, resource management system 202 can manage application 205. This management can include, for example, migrating application 205.

In migrating application 205, affinity 209 between application 205 and components 203 can be taken into account to determine whether any of components 203 should be migrated with application 205. Components 203 can include at least one of a database, another application such as applications 204, a virtual server, cached data, data structure, a table, a cache, or other components that application 205 may at least one of communicate with, access, or use, in performing a set of workloads 207.

As used herein, a "set of" when used with reference items means one or more items. For example, a set of workloads 207 is one or more of workloads 207.

In this illustrative example, resource management system 202 comprises computer system 212 and resource manager 214. Resource manager 214 is located in computer system 212. In this example, resource manager 214 can determine the affinity of components 203 to application 205.

Resource manager 214 can be implemented in software, hardware, firmware or a combination thereof. When software is used, the operations performed by resource manager 214 can be implemented in program instructions configured to run on hardware, such as a processor unit. When firmware is used, the operations performed by resource manager 214 can be implemented in program instructions and data and stored in persistent memory to run on a processor unit. When hardware is employed, the hardware can include circuits that operate to perform the operations in resource manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are on the same computer or on different computers. In other words, the process can be distributed between processor units 216 on the same or different computers in computer system 212. Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, resource manager 214 can determine affinity 209 for application 205. As depicted, resource manager 214 collects affinity data 220 from sources 222. The collection of affinity data can be made using a push or pull process. Affinity data 220 can be collected specifically for application 205 for a set of components 203 in addition to application 205.

The collection of affinity data 220 by resource manager 214 from sources 222 can take a number of different forms. For example, resource manager 214 can collect affinity data 220 from a first number of sources 222. This type of collection of affinity data 220 can be periodic or nonperiodic. For example, the collection of the first number of sources 222 may be in response to a one time event such as a request made by resource manager 214. In another example, the request can be made periodically by resource manager 214 once every two years or some other period of time. In another example, resource manager 214 can collect affinity data 220 from a second number of sources 222 iteratively.

In the illustrative example, a connection can be a static connection that does not change or does not change sufficiently to need frequent or periodic identification. The details for the static connection details can be located in sources 222 and can include details such as configuration files, database communication tables, hardcoded in applications, or other sources. With these types of connections, the collection of affinity data 220 may occur infrequently, such as once a year or every two years for some other period of time.

In this example, resource manager 214 determines connections 224 in affinity data 220 for the set of workloads 207 for application 205. In this example, connections 224 are connections that application 205 have to components 203 in processing the set of workloads 207. For example, affinity data 220 can comprise connections 224 between servers in components 203 processing a workload for application 205.

In one illustrative example, the information for a connection in affinity data 220 comprises a server name, an application name, a source IP address, and a destination IP address. Additionally, the information about a connection in affinity data 220 can also include a timestamp. This timestamp can be used in a rollout prediction analysis for time-based workloads.

Resource manager 214 assigns weights 226 to connections based on a number of hops 228 for connections 224. In this example, hops 228 refers to the number of segments that a data travels through. A hop count refers to the number of network devices through which data passes from source to destination. Depending on a routing protocol used, this count can include the source and destination, that is, the first hop is counted as hop 0 or hop 1.

In one illustrative example, resource manager 214 collects affinity data 220 for incoming connections 230 and outgoing connections 232 in connections 224. Affinity data for these connections can be performed using a rolling window. A rolling window can be a window that shifts at each collection. For example, a window can be selected that is 1 minute, 5 minutes, 15 minutes, 1 hour, or some other period of time. This window of time can be a rolling window when the start time for collecting data shifts at each collection. For example, on January 1, the data collection runs at 00:15, 00:30, . . . 09:00, 09:15, 09:30, 09:45 for a 24 hour period. On January 2, the data collection runs at 00:16, 00:31, . . . 09:01, 09:16, 09:31, 09:46 and so on for a 24 hour period. On January 3, data collection runs at 00:17, 00:32, . . . 09:02, 09:17, 09:32, 09:47 and so on for 24 hour period. This changing of the start time of the window is considered a rolling window in this example.

In this illustrative example, weights 226 indicate affinity 209 to components 203 related to a set of workloads 207. In other words, weights 226 can indicate a level of affinity 209 for connections 224. This level affinity for connections 224 can be used to determine a level of affinity 209 that components 203 with connections 224 to application 205 have with application 205 with respect to the processing of workloads 207. For example, a higher weight for a connection indicates a lower level of affinity 209. A lower weight for the connection indicates a higher level of affinity 209 to the component to which the connection is made.

In one example, when processing a set of workloads 207, application 205 may communicate with a set of components 203. Those communications involve connections 224 that can be analyzed using affinity data 220 to determine a level of affinity 209 that application 205 has with the set of components 203 in performing the set of workloads 207. When other workloads are performed other than the set of workloads 207, affinity 209 with the set of components 203 can change or be different.

With the determination of affinity 209 to application 205 with components 203, resource manager 214 can perform various operations in managing application 205. For example, resource manager 214 can migrate application 205 from a current computer or server to a new computer or server. In yet another illustrative example, changes to workloads 207 can be made. With the identification of affinity 209 to components 203, data sets at components 203 for one or more current workloads in workloads 207 can be identified and migrated when migrating application 205 with respect to workloads 207. This migration can reduce delays, latency, or errors in processing current workloads in workloads 207. Further, affinity 209 of application 205 to components such as applications 204 can be identified such that migration of those applications can also be performed depending on the level of affinity 209.

In one example, resource manager 214 can migrate application 205. Further, as part of this migration, resource manager 214 can migrate selected data 240 for a current set of workloads 207 for application 205 based on affinity 209 of selected data 240 to application 205. In this example, affinity 209 for selected data 240 can be determined from affinity 209 of connections 224 to components 203. These components can be examined to identify selected data 240 located at components 203.

As another example, resource manager 214 can migrate a number of applications 204 with application 205 as application group 235 based on affinity 209 of the number of applications 204 to application 205. Further in this example, resource manager 214 can place the number of applications in application group 235 that have a weight equal to or less than a threshold distance.

In this example, threshold distance can be, for example, a value such as the number of hops 228 when weights 226 is based on the number of hops 228. As a result, when the number of hops is low, the threshold distance can be low enough such that a particular application in applications 204 should be included in application group 235. The particular threshold distance used can depend on particular applications, service level objectives (SLOs), service level agreements (SLAs), and other factors.

In one illustrative example, one or more technical solutions are present that overcome a technical problem with determining relationships between an application and other components. As a result, one or more illustrative examples can enable determining the strength of relationship between an application and other components. The strength of the relationship takes the form of an affinity. This affinity can be used to determine what components should be moved when migrating an application or performing other operations that have an effect on a workload that is being performed during the migration.

In the illustrative example, the use of resource manager 214 in computer system 212 integrates processes into a practical application for determining the affinity of an application with other components. This affinity can be used to perform operations that can affect an ongoing workload for the application. For example, in migrating an application, the identification of other components that have an affinity with the application can be used to determine which components such as other applications to move with the application. This identification of other applications for migration can reduce issues with an ongoing workload or workloads being performed when the application is migrated. As a result, the use of this affinity data can increase the performance of computer system 212 to provide higher accuracy in performing workloads when migrating an application.

The illustration of affinity environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the identification of affinity 209 between application 205 and other components in components 203 such as one or more of applications 204 can be used to identify other components in addition to or in place of applications 204. For example, other components that can be grouped for movement include a database, a cache, a server, a container, or other or other components that have communications with application 205 in processing workloads 207. In these examples, the communications can be identified using connections 224.

Figure 3:
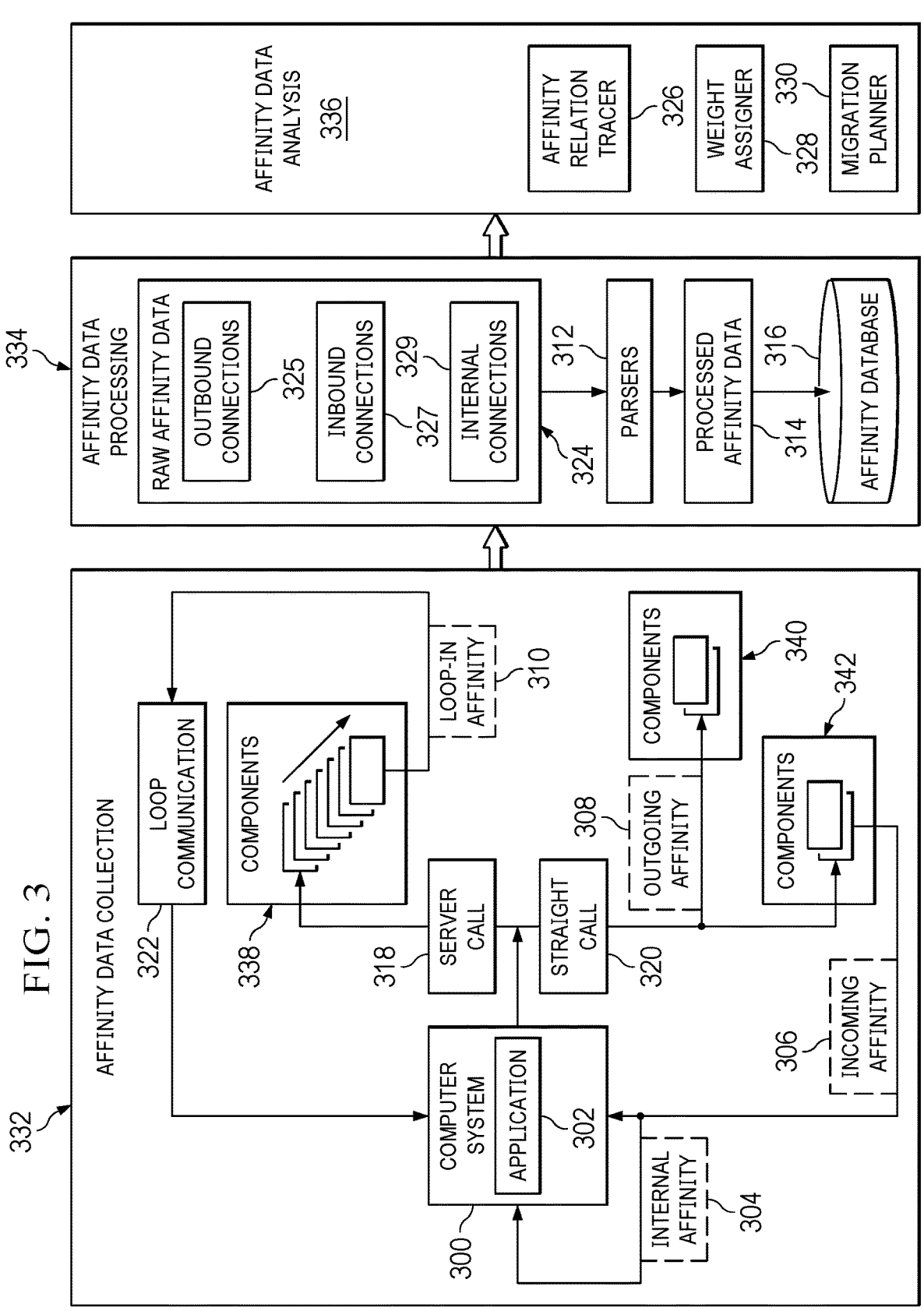
FIG. 3 is a block diagram illustrating data flow in a resource management system in accordance with an illustrative embodiment.

With reference now to FIG. 3, a block diagram illustrating data flow in a resource management system is depicted in accordance with an illustrative embodiment. In this illustrative example, FIG. 3 shows an example of collecting, processing, and analyzing affinity data performed by resource management system 202 in FIG. 2. In this depicted example, data flow of affinity data is designed to have three phases of data processing in the data flow. These three phases comprises affinity data collection 332, affinity data processing 334, and affinity data analysis 336.

As depicted, application 302 is located in computer system 300. Application 302 is an example of application 205 in FIG. 2. In this example, application 302 has connections with a number of components such as components 338, components 340, and components 342 for processing workloads. Components 338, components 340, and components 342 are examples of components 203 in FIG. 2.

In this illustrative example, the connections for application 302 has can be, for example, internal connections with components in the same computer system as application 302, external connections with components in a different computer system as application 302. For example, if computer system 300 is a mainframe computer, application 302 can have an internal connection with an application in the mainframe computer, and an external connection with an application in a server computer that is called by application 302 in mainframe computer.

In this example, application 302 can make calls to components with a connection to application 302. For example, application 302 can make server call 318 to a sequence of applications in components 338, or straight call 320 to a single application in components 340.

In one example, a call to a sequence of components 338 can begin with application 302 sending a call to an application running on a first server and components that create calls. This call can result in the application calling another component in components 338 on a second server in components 338 as part of calls to a sequence of applications. An example of straight call 320 is a call by application 302 to update a database. In this example, application 302 can make the update by calling a server that is a database server for the database to be updated.

In this illustrative example, affinity data is collected to determine the affinity of application 302 to components such as components 338, components 340, and components 342. As depicted, affinities are representations of the relationship between application 302 and other components. The affinities can indicate the strength of the relationship.

For example, affinities can be expressed as percentages, where 100% represents the strongest relationship, while 0% represents the weakest relationship. In this illustrative example, affinity data describes affinity between application 302 and different components. For example, raw affinity data 324 can include data for at least one of outbound connections 325, inbound connections 327, and internal connections 329. Affinity data describing the connections can include, for example, a server name, an application name, a source IP address, and a destination IP address.

Sources for affinity data can include static data such as database definitions and code definitions, or dynamic data such as system dump, TCP/IP command dump, or traces. These sources of raw affinity data 324 can be used to identify connections that are static. Additionally, raw affinity data 324 for connections made through calls can be obtained from other sources such as system logs, schedule jobs, call tracing programs, and other suitable sources that can provide information about connections that are made dynamically.

As depicted in this example, the affinity of application 302 with other components is based on weights that are determined by the number of hops that represent segments that data travel through. The hops are examples of hops 228 in FIG. 2. For example, the affinity of application 302 to a component in components 338 can be determined by number of network devices through which data passes from application 302 to the component of components 338.

Communications from connections between application 302 with components identified using affinity data can be used determine affinities between application 302 and the different components that application 302 communicates with during the running of application 302.

In this illustrative example, analysis of different types of communications can result in different types of affinity. For example, application 302 can have outgoing affinity 308 determined by affinity data of outgoing communications with components, such as making straight call 320 to components 340. In one example, application 302 can have incoming affinity 306 determined from raw affinity data 324 for incoming communications received from other components. This raw infinity data can be, for example, data for a call to application 302 received from components 342. In another example, application 302 can have internal affinity 304 determined from affinity data of communications with other components within computer system 300.

In yet another example, application 302 can have loop-in affinity 310 determined by affinity data of communications with a sequence of components. In this example, application 302 makes a server call 318 to components 338. This call can be indirect call that travels through a sequence of components 338. In this example, a loop affinity is present because application 302 receives loop communication 322 from the last component of the sequence of components 338.

After affinity data collection 332, affinity data processing 334 receives raw affinity data 324 for processing. In this example, static affinity data in raw affinity data 324 is collected one time. Dynamic affinity data in raw affinity data 324 is collected from computer system 300 using a rolling window. For example, a window can be selected that is 1 minute, 5 minutes, 15 minutes, 1 hour, or some other period of time. Raw affinity data 324 for application 302 are sent to parsers 312 for further processing. Raw affinity data 324 can be received in various formats and can include information that may not be needed for determining affinity. Further, duplicate data for the same connection can also be present in raw affinity data 324. This duplicate data is removed in these examples.

In this example, parsers 312 generates processed affinity data 314 by converting raw affinity data 324 to a desired format and removing duplicate data from raw affinity data 324. Selected data 240 exchanges information with affinity database 316 to obtain connection information so that processed affinity data 314 also includes information associated with connection between application 302 and other components such as components 338, components 340, and components 342. In this example, affinity database 316 includes data such as port information associated with connections between application 302 and other components such as components 338, components 340, and components 342, source IPs, target IPs, and information associated with application calls, and database accesses of connections.

After processing, processed affinity data 314 is analyzed using affinity data analysis 336. In one example, affinity data analysis 336 can perform a number of analyses using processed affinity data 314. For example, affinity data analysis 336 can perform affinity relation tracing using affinity relation tracer 326 so that the affinity of application 302 to other components can be constantly tracked and updated.

In another example, affinity data analysis 336 can also perform weight assignment using weight assigner 328. In this example, weight assigner 328 uses information for hops in processed affinity data 314 to assign a weight for each connection between application 302 and other components such as components 338, components 340, and components 342. In this illustrative example, assigned weights for each connection between application 302 and other components can be an example of weights 226 in FIG. 2. These assigned weights can be placed in affinity database 316 to indicate the level of affinity between application 302 and other components in communication with application 302.

In yet another example, affinity data analysis 336 can also include migration planner 330. Migration planner 330 can be used to plan migration of application 302. This migration can include other applications to be migrated with application 302 based on the affinity identified for application 302 with other applications. These other applications can be, for example, one or more of components 338, components 340, and components 342.

The illustration of the dataflow in FIG. 3 is provided as an example of one manner in which dataflow can be implemented for collecting and analyzing affinity data to determine affinity for application 302. This illustration is not meant to limit the manner in which other illustrative examples can be implemented. For example, this dataflow can be used for one or more applications in addition to application 302. Dataflow can be performed in parallel for the different applications.

Figure 4A:
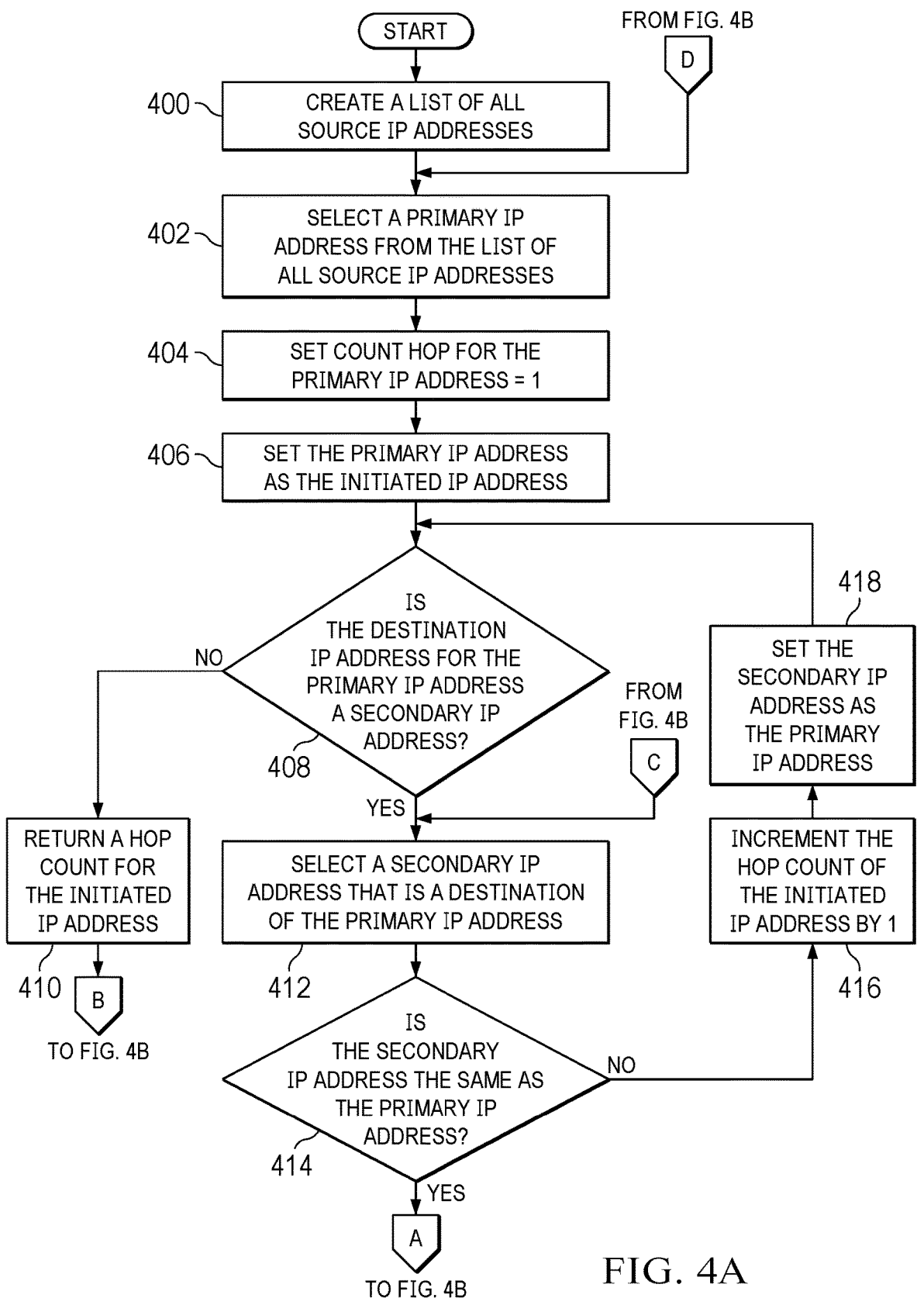
FIGS. 4A-4B are a flowchart of a process for determining hop counts for connections for applications in accordance with an illustrative embodiment.
Figure 4B:
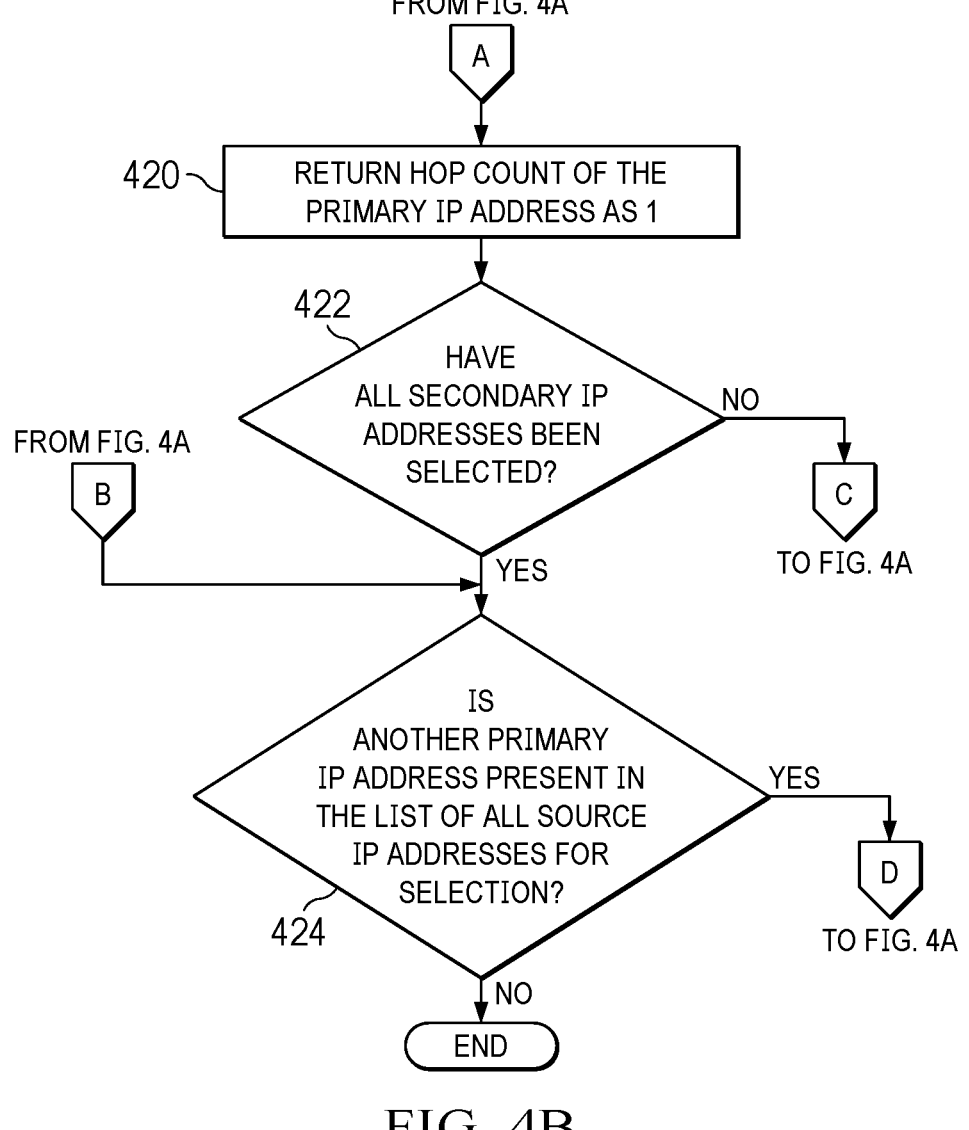

With reference to FIGS. 4A-4B, a flowchart of a process for determining hop counts for connections for applications is depicted in accordance with an illustrative embodiment. The process in FIGS. 4A-4B can be implemented in hardware, software, or both. When implemented in software, the process can take the form of program instructions that is run by one of more processor units located in one or more hardware devices in one or more computer systems. For example, the process can be implemented in resource manager 214 in resource management system 202 in FIG. 2. In this example, the process uses distinct connection information. In this example, prior to the process beginning, duplicate connection data is removed to ensure that all source IPs are not from duplicate connections.

The process begins by creating a list of all source IP addresses (step 400). The process selects a primary IP address from the list of all source IP addresses (step 402). In step 402, primary IP addresses from the list of all source IP addresses are the IP addresses where the applications of interest are located. In other words, primary IP addresses are the IP addresses of applications for use in determining affinity. In this depicted example, the list of all source IP addresses can have multiple primary IP addresses that correspond to multiple applications of interest.

The process sets the hop count for the primary IP address equal to 1 (step 404). As depicted, hop counts identify the number of network devices through which data passes from source to destination. As a result, a high hop count indicates that the source is farther from the from destination than a low hop count.

The process sets the primary IP address as the initiated IP address (step 406). In this step, the initiated IP address has a hop count of 1. The process determines whether the destination IP address for the primary IP address is a secondary IP address (step 408). In this illustrative example, a secondary IP address is a source IP address that is also a destination from the primary IP address.

If the destination IP address for primary IP address is a secondary IP address, the process selects a secondary IP address that is a destination of the primary IP address (step 412). The process determines whether the secondary IP address is the same as the primary IP address (step 414). If the secondary IP address is same as the primary IP address, the process returns a hop count of the primary IP address as 1 (step 420).

The process determines whether all secondary IP addresses have been selected (step 422). If all secondary IP addresses have been selected, the process determines whether another primary IP address is present in the list of all source IP addresses for selection (step 424). If another primary IP address is present in the list of source IP addresses, the process returns to step 402 and repeats step 402 to step 424 until all primary IP addresses in the list of all distinct source IP addresses have been selected. The process terminates thereafter.

With reference again to step 408, if the destination IP address for the primary IP address is not a secondary IP address, the process returns the hop count for initiated IP address (step 410). The process then proceeds to step 424.

With reference again to step 422, if all secondary IP addresses have not been selected, the process proceeds to step 412 to select another secondary IP address that is a destination of the primary IP address. In this illustrative example, the process repeats step 412 to step 422 until all secondary IP addresses have been selected.

With reference again to step 414, if the secondary IP is not the same as the primary IP, the process increments the hop count for the initiated IP address by 1 (step 416). The process sets the secondary IP address as the primary IP address (step 418), and the process then returns to step 408 as described above.

Figure 5:
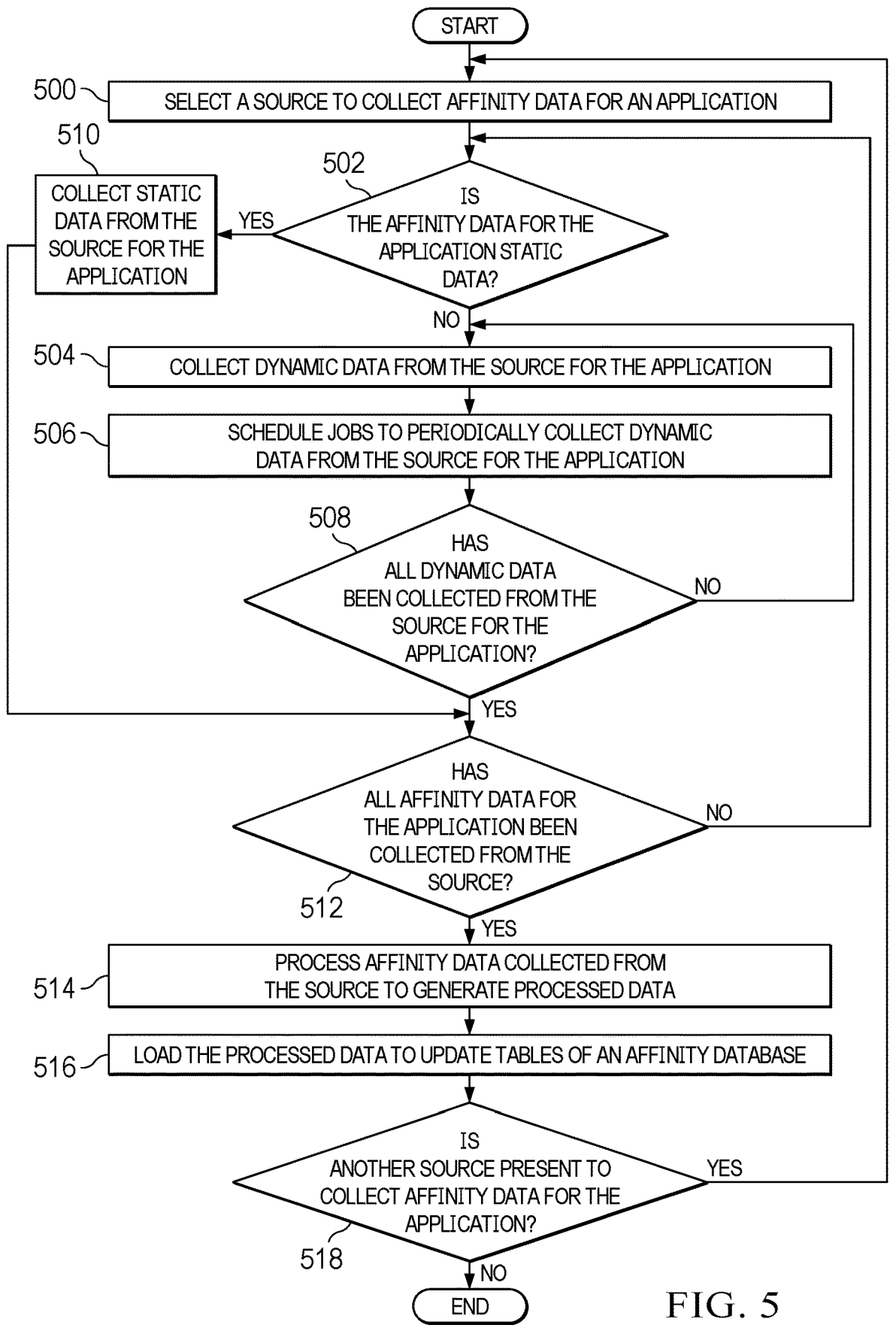
FIG. 5 is a flowchart of a process for collecting and processing affinity data in accordance with an illustrative embodiment.

With reference to FIG. 5, a flowchart of a process for collecting and processing affinity data is depicted in accordance with an illustrative embodiment. The process in FIG. 5 can be implemented in hardware, software, or both. When implemented in software, the process can take the form of program instructions that is run by one of more processor units located in one or more hardware devices in one or more computer systems. For example, the process can be implemented in resource manager 214 in resource management system 202 in FIG. 2. In this example, the process in FIG. 5 is an example of one implementation for affinity data collection 332 and affinity data processing 334 in FIG. 3.

The process begins by selecting a source to collect affinity data for an application (step 500). The process determines whether the affinity data for the application is static data (step 502). In this example, static data is information that does not change over time, such as database definitions, code definitions, or configurations, communication definitions, and IP address for the application. The static data may change when changes to applications or configurations are made. This type of data is in contrast to dynamic data which can change each time a call is made for connection. If the affinity data for the application is static data, the process collects static data from the source for the application (step 510).

The process then determines whether all affinity data for the application has been collected from the source (step 512). If all affinity data for the application has been collected from the source, the process processes affinity data collected from the source to generate processed affinity data (step 514). Otherwise, the process returns to step 502 and repeats step 502 to step 512 until all affinity data for the application has been collected from the source.

In this example, the process processes the affinity data collected from the source by using parsers to remove duplicate data and converts the affinity data to a desired format. As a result, all of the affinity data can be in the same format for further analysis and use. In step 514, the parsers can be parsers 312 in FIG. 3 and the processed affinity data can be an example of processed affinity data 314 in FIG. 3.

The process loads the processed data to update tables of an affinity database (step 516). As depicted, the affinity database includes data such as port information associated with connections between the application and other components, source IP addresses, target IP address, and information associated with application calls, and database accesses of connections. In this example, the affinity database can be affinity database 316 in FIG. 3.

The process determines whether another source is present to collect affinity data for the application (step 518). If another source is present to collect affinity data for the application, the process returns to step 500 and repeats step 500 to 518 until affinity data for the application has been collected from all sources. The process terminates thereafter.

With reference again to step 502, if the affinity data for the application is not static data, the process proceeds to step 504 to collect dynamic data from the source for the application (step 504). In this example, dynamic data is information that can change periodically. For example, dynamic data can be information associated with the application that can be collected from system log, system dump, TCP/IP command dump, and traces.

The process schedules jobs to periodically collect dynamic data from the source for the application (step 506). In this example, periodic collection of dynamic data from the source can be performed using a rolling window. For example, a window can be selected that is 1 minute, 5 minutes, 15 minutes, 1 hour, or some other period of time.

The process determines whether all dynamic data has been collected from the source for the application (step 508). If all dynamic data has been collected from the source for the application, the process proceeds to step 512 as described above. Otherwise, the process returns to step 504 until all dynamic data has been collected from the source for the application.

Figure 6:
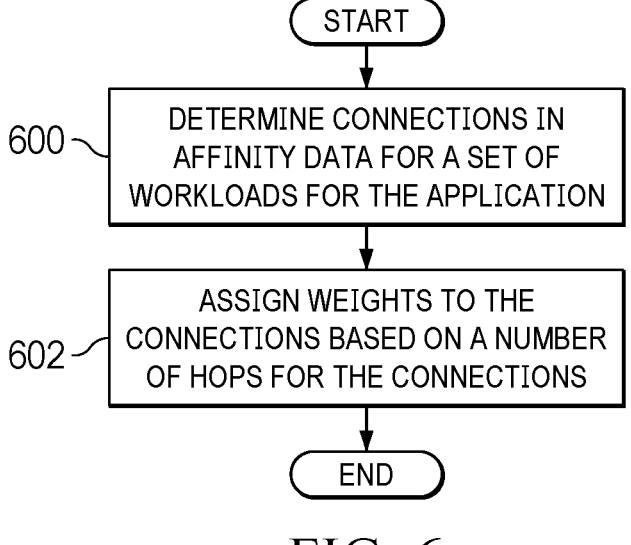
FIG. 6 is a flowchart of a process for determining an affinity for an application in accordance with an illustrative embodiment.

Turning next to FIG. 6, a flowchart of a process for determining an affinity for an application is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in resource manager 214 in computer system 212 in FIG. 2.

The process begins by determining connections in affinity data for a set of workloads for the application (step 600). The process assigns weights to the connections based on a number of hops for the connections (step 602). The process terminates thereafter. In step 602, the weights indicate a level the affinity to components related to the set of workloads.

The weights indicate a level of affinity for the connections. This affinity for the connection can be used to determine affinity for components at the connections.

Figure 7:
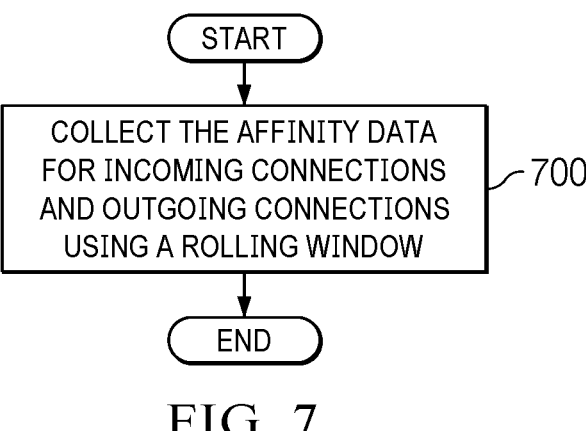
FIG. 7 is a flowchart of a process for collecting affinity data in accordance with an illustrative embodiment.

With reference now to FIG. 7, a flowchart of a process for collecting affinity data is depicted in accordance with an illustrative embodiment. The process in this figure is an example of an additional step that can be performed in addition to the steps in FIG. 6.

The process collects the affinity data for incoming connections and outgoing connections using a rolling window (step 700). The process terminates thereafter.

Figure 8:
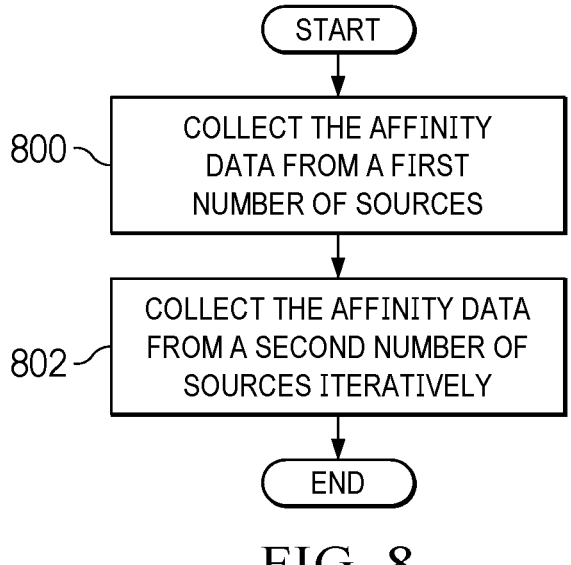
FIG. 8 is a flowchart of a process for collecting affinity data in accordance with an illustrative embodiment.

Next with reference FIG. 8, a flowchart of a process for collecting affinity data is depicted in accordance with an illustrative embodiment. The process in FIG. 8 is an example of additional steps that can be performed in addition to the steps in FIG. 6.

The process begins by collecting the affinity data from a first number of sources (step 800). The process collects the affinity data from a second number of sources iteratively (step 802). The process terminates thereafter.

Figure 9:
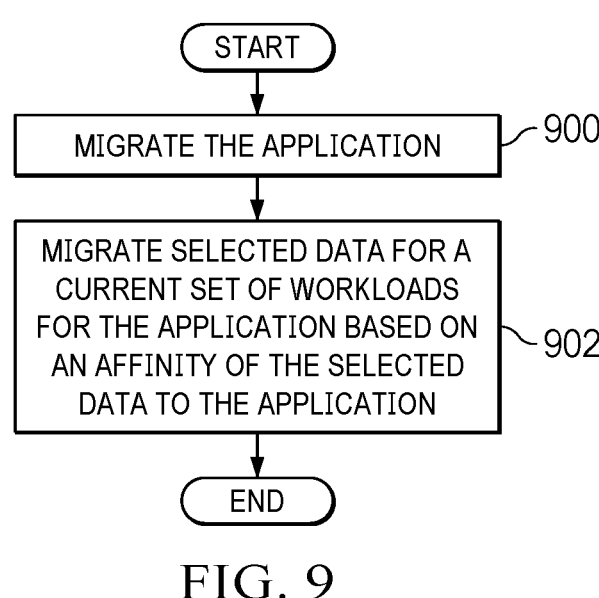
FIG. 9 is a flowchart of a process for migrating an application in accordance with an illustrative embodiment.

In FIG. 9, a flowchart of a process for migrating an application is depicted in accordance with an illustrative embodiment. The process in FIG. 9 is an example of additional steps that can be performed in addition to the steps in FIG. 6.

The process begins by migrating the application (step 900). The process migrates selected data for a current set of workloads for the application based on an affinity of the selected data to the application (step 902). The process terminates thereafter.

Figure 10:
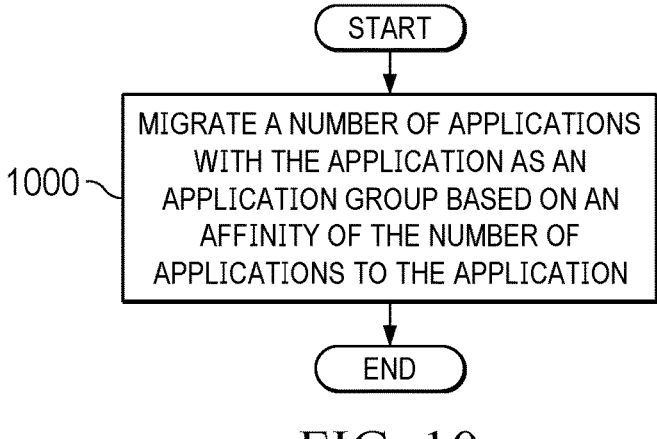
FIG. 10 is a flowchart of a process for migrating an application in accordance with an illustrative embodiment.

Turning to FIG. 10, a flowchart of a process for migrating an application is depicted in accordance with an illustrative embodiment. The process in FIG. 10 is an example of additional steps that can be performed in addition to the steps in FIG. 9.

The process migrates a number of applications with the application as an application group based on an affinity of the number of applications to the application (step 1000). The process terminates thereafter.

In this flowchart the number of applications is migrated in addition to the selected data. In other examples, the number of applications can be migrated without migrating selected data depending on the particular implementation.

Figure 11:
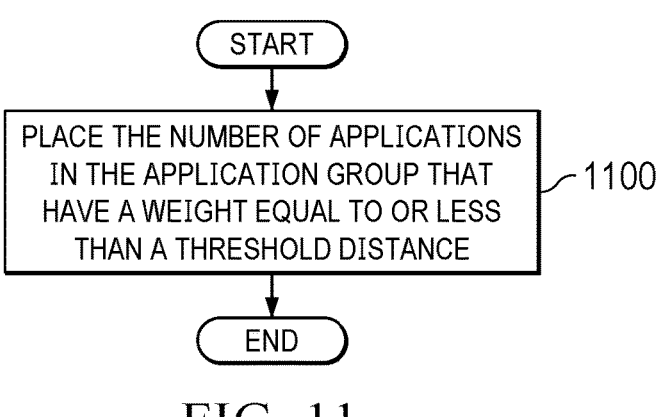
FIG. 11 is a flowchart of a process for selecting applications for migration in accordance with an illustrative embodiment.

With reference now to FIG. 11, a flowchart of a process for selecting applications for migration is depicted in accordance with an illustrative embodiment. The process in FIG. 11 is an example of additional steps that can be performed in addition to the steps in FIG. 10.

The process places the number of applications in the application group that have a weight equal to or less than a threshold distance (step 1100). The process terminates thereafter. In this example, the threshold distance can be the number of parts. The weight can be greater as number part is smaller. For example, applications that have five or less hops can be selected for placement into the application group. With this example, the threshold distance is five hops. And the threshold weight is the number of hops for a particular connection from the application selected for migration to the application being considered for the application group for migration with the selected application.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
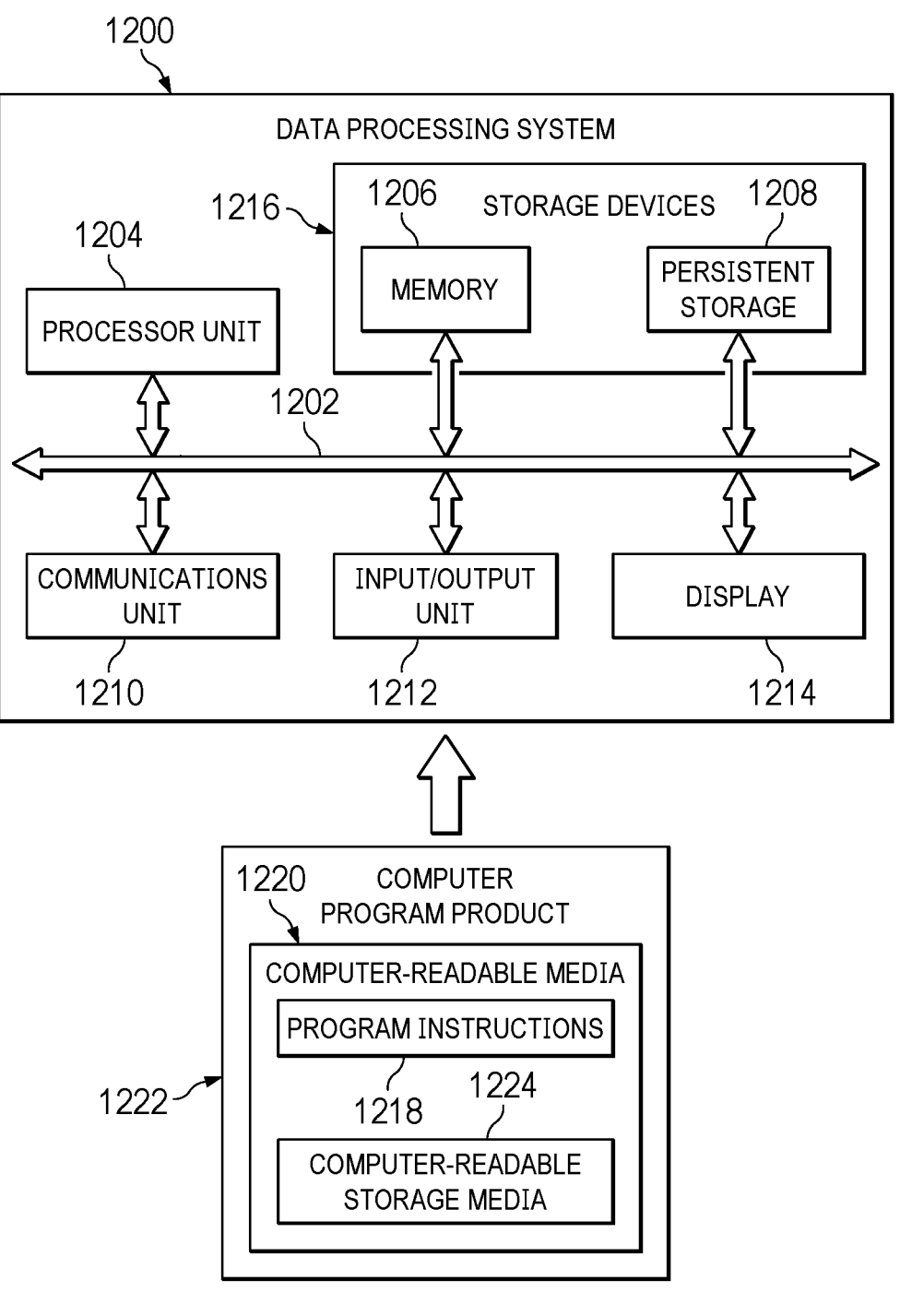
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement computers and computing devices in computing environment 100 in FIG. 1. Data processing system 1200 can also be used to implement computer system 212 in FIG. 2 and computer system 300 in FIG. 3.

In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1216 may also be referred to as computer readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program instructions, computer usable program instructions, or computer readable program instructions that can be read and executed by a processor in processor unit 1204. The program instructions in the different embodiments can be embodied on different physical or computer readable storage media, such as memory 1206 or persistent storage 1208.

Program instructions 1218 is located in a functional form on computer readable media 1220 that is selectively removable and can be loaded onto or transferred to data processing system 1200 for execution by processor unit 1204. Program instructions 1218 and computer readable media 1220 form computer program product 1222 in these illustrative examples. In the illustrative example, computer readable media 1220 is computer readable storage media 1224.

Computer readable storage media 1224 is a physical or tangible storage device used to store program instructions 1218 rather than a medium that propagates or transmits program instructions 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1218 can be transferred to data processing system 1200 using a computer readable signal media. The computer readable signal media are signals and can be, for example, a propagated data signal containing program instructions 1218. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1220" can be singular or plural. For example, program instructions 1218 can be located in computer readable media 1220 in the form of a single storage device or system. In another example, program instructions 1218 can be located in computer readable media 1220 that is distributed in multiple data processing systems. In other words, some instructions in program instructions 1218 can be located in one data processing system while other instructions in program instructions 1218 can be located in one data processing system. For example, a portion of program instructions 1218 can be located in computer readable media 1220 in a server computer while another portion of program instructions 1218 can be located in computer readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program instructions 1218.

Thus, illustrative embodiments of the present invention provide a computer implemented method, computer system, and computer program product for determining resource affinity for an application. A number of processor units determine connections in affinity data for the workloads for an application. The number of processor units assign weights to the connections based on a number of hops for the connections.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method comprising:

collecting, by a number of processor units, affinity data by monitoring existing communication connections between servers actively processing a set of workloads for an application over a rolling time window;

determining, by the number of processor units, the existing communication connections in the collected affinity data for the set of workloads, wherein each connection in the affinity data identifies at least a server name, an application name, a source IP address, and a destination IP address associated with the set of workloads for the application; and assigning, by the number of processor units, weights to the connections based on a number of hops between the servers for the connections, wherein a lesser number of hops between the servers corresponds to a lower weight and a higher level of affinity, such that the weights indicate a degree of affinity of the servers and their associated components to the application; and using, by the number of processor units, the weights to identify components having an affinity to the application that satisfies a threshold affinity value for migration of the application to a target environment.

2. The computer implemented method of claim 1 further comprising:

collecting, by the number of processor units, the affinity data for incoming connections and outgoing connections using a rolling window.

3. The computer implemented method of claim 1 further comprising:

collecting, by the number of processor units, the affinity data from a first number of sources; and collecting, by the number of processor units, the affinity data from a second number of sources iteratively.

4. The computer implemented method of claim 1 further comprising:

migrating, by the number of processor units, the application; and migrating, by the number of processor units, selected data for a current set of workloads for the application based on an affinity of the selected data to the application.

5. The computer implemented method of claim 4 further comprising:

migrating, by the number of processor units, a number of applications with the application as an application group based on an affinity of the number of applications to the application.

6. The computer implemented method of claim 5, further comprising:

placing, by the number of processor units, the number of applications in the application group that have a weight equal to or less than a threshold distance.

7. The computer implemented method of claim 1, wherein determining the connections in the collected affinity data comprises determining at least one of:

an incoming affinity from affinity data of incoming communications received by the application from other components;

an outgoing affinity from affinity data of outgoing communications made by the application to other components;

an internal affinity from affinity data of communications between the application and other components within a same computer system as the application; or a loop-in affinity from affinity data of communications in which the application makes a call that travels through a sequence of components and the application receives a return communication from a last component in the sequence.

8. The computer implemented method of claim 1, wherein each connection in the affinity data further comprises a timestamp, and wherein the number of processor units uses the timestamp in a rollout prediction analysis for time-based workloads.

9. The computer implemented method of claim 1, wherein collecting the affinity data comprises:
   collecting static affinity data from at least one of a configuration file, a database communication table, or a code definition for the application; and
   collecting dynamic affinity data iteratively from at least one of a system log, a system dump, a TCP/IP command dump, or a trace.

10. A computer system comprising:
   a number of processor units, wherein the number of processor units executes program instructions to:
   collect affinity data by monitoring existing communication connections between servers actively processing a set of workloads for an application over a rolling time window;
   determine the existing communication connections in the collected affinity data for the set of workloads, wherein each connection in the affinity data identifies at least a server name, an application name, a source IP address, and a destination IP address associated with the set of workloads for the application; and
   assign weights to the connections based on a number of hops between the servers for the connections, wherein a lesser number of hops between the servers corresponds to a lower weight and a higher level of affinity, such that the weights indicate a degree of affinity of the servers and their associated components to the application; and
   using the weights to identify components having an affinity to the application that satisfies a threshold affinity value for migration of the application to a target environment.

11. The computer system of claim 10, wherein the number of processor units executes the program instructions to:
   collect the affinity data for incoming connections and outgoing connections using a rolling window.

12. The computer system of claim 10, wherein the number of processor units executes the program instructions to:
   collect the affinity data from a first number of sources; and
   collect the affinity data from a second number of sources iteratively.

13. The computer system of claim 10, wherein the number of processor units executes the program instructions to:
   migrate the application; and
   migrate selected data for a current set of workloads for the application based on an affinity of the selected data to the application.

14. The computer system of claim 13, wherein the number of processor units executes the program instructions to:
   migrate a number of applications with the application as an application group based on an affinity of the applications to the application.

15. The computer system of claim 14, wherein the number of processor units executes the program instructions to:
   place the number of applications in the application group that have a weight equal to or less than a threshold distance.

16. The computer system of claim 10, wherein the operations of determining the connections in the collected affinity data comprise determining at least one of:
   an incoming affinity from affinity data of incoming communications received by the application from other components;
   an outgoing affinity from affinity data of outgoing communications made by the application to other components;
   an internal affinity from affinity data of communications between the application and other components within a same computer system as the application; or
   a loop-in affinity from affinity data of communications in which the application makes a call that travels through a sequence of components and the application receives a return communication from a last component in the sequence.

17. The computer system of claim 10, wherein each connection in the affinity data further comprises a timestamp, and wherein the number of processor units uses the timestamp in a rollout prediction analysis for time-based workloads.

18. The computer system of claim 10, wherein the operations of collecting the affinity data comprise:
   collecting static affinity data from at least one of a configuration file, a database communication table, or a code definition for the application; and
   collecting dynamic affinity data iteratively from at least one of a system log, a system dump, a TCP/IP command dump, or a trace.

19. A computer program product comprising a computer readable storage medium having program instructions embodied therewith, the program instructions executable by a computer system to cause the computer system to perform operations comprising:
   collecting affinity data by monitoring existing communication connections between servers actively processing a set of workloads for an application over a rolling time window;
   determining the existing communication connections in the collected affinity data for the set of workloads, wherein each connection in the affinity data identifies at least a server name, an application name, a source IP address, and a destination IP address associated with the set of workloads for the application; and
   assigning weights to the connections based on a number of hops between the servers for the connections, wherein a lesser number of hops between the servers corresponds to a lower weight and a higher level of affinity, such that the weights indicate a degree of affinity of the servers and their associated components to the application; and
   using the weights to identify components having an affinity to the application that satisfies a threshold affinity value for migration of the application to a target environment.

20. The computer program product of claim 19, wherein the program instructions further cause the computer system to perform operations comprising determining at least one of:
   an incoming affinity from affinity data of incoming communications received by the application from other components;
   an outgoing affinity from affinity data of outgoing communications made by the application to other components;

an internal affinity from affinity data of communications between the application and other components within a same computer system as the application; or a loop-in affinity from affinity data of communications in which the application makes a call that travels through a sequence of components and the application receives a return communication from a last component in the sequence.

\*   \*   \*   \*   \*